(12) United States Patent
Freeman et al.

(10) Patent No.: US 11,053,817 B2
(45) Date of Patent: Jul. 6, 2021

(54) TURBINE SHROUD ASSEMBLY WITH CERAMIC MATRIX COMPOSITE BLADE TRACK SEGMENTS AND FULL HOOP CARRIER

(71) Applicants: Rolls-Royce North American Technologies Inc., Indianapolis, IN (US); Rolls-Royce Corporation, Indianapolis, IN (US)

(72) Inventors: Ted J. Freeman, Danville, IN (US); Aaron D. Sippel, Zionsville, IN (US); Paulo Bazan, Coconut Creek, FL (US)

(73) Assignees: Rolls-Royce Corporation, Indianapolis, IN (US); Rolls-Royce North American Technologies Inc., Indianapolis, IN (US)

(*) Notice: Subject to any disclaimer, the term of this patent is extended or adjusted under 35 U.S.C. 154(b) by 0 days.

(21) Appl. No.: 16/688,538

(22) Filed: Nov. 19, 2019

(65) Prior Publication Data
US 2021/0148251 A1 May 20, 2021

(51) Int. Cl.
*F01D 11/08* (2006.01)
*F01D 25/24* (2006.01)
*F01D 9/04* (2006.01)

(52) U.S. Cl.
CPC ............ *F01D 25/246* (2013.01); *F01D 9/04* (2013.01); *F05D 2240/11* (2013.01); *F05D 2240/12* (2013.01); *F05D 2260/30* (2013.01); *F05D 2300/6033* (2013.01)

(58) Field of Classification Search
CPC ........ F01D 25/246; F01D 25/28; F01D 25/26; F01D 11/08; F01D 11/005; F05D 2300/6033; F05D 2250/23; F05D 2250/13; F05D 2240/11
See application file for complete search history.

(56) References Cited

U.S. PATENT DOCUMENTS

| | | | |
|---|---|---|---|
| 5,080,557 A | 1/1992 | Berger | |
| 6,733,235 B2* | 5/2004 | Alford | F01D 11/08 415/173.1 |
| 6,821,085 B2 | 11/2004 | Darkins, Jr. et al. | |
| 6,884,026 B2 | 4/2005 | Glynn et al. | |
| 7,210,899 B2* | 5/2007 | Wilson, Jr. | F01D 11/18 415/173.1 |
| 7,416,362 B2 | 8/2008 | North | |
| 8,932,009 B2* | 1/2015 | Moraines | F01D 11/24 415/173.1 |
| 9,587,517 B2 | 3/2017 | Vetters et al. | |
| 9,863,265 B2 | 1/2018 | Stapleton | |
| 2006/0292001 A1 | 12/2006 | Keller et al. | |
| 2016/0319688 A1 | 11/2016 | Vetters et al. | |
| 2018/0051581 A1 | 2/2018 | Quennehen et al. | |
| 2018/0291769 A1* | 10/2018 | Vetters | F01D 25/246 |
| 2018/0340440 A1 | 11/2018 | Freeman et al. | |

* cited by examiner

*Primary Examiner* — Woody A Lee, Jr.
*Assistant Examiner* — Maxime M Adjagbe
(74) *Attorney, Agent, or Firm* — Barnes & Thornburg LLP

(57) ABSTRACT

A turbine shroud adapted for use in a gas turbine engine includes a blade track segment and a carrier. The blade track segment includes an arcuate shroud wall that extends circumferentially partway around an axis and a mount post that extends radially outward away from the shroud wall. The carrier is coupled with the mount post of the blade track segment to support the blade track segment.

18 Claims, 7 Drawing Sheets

TURBINE SHROUD ASSEMBLY WITH CERAMIC MATRIX COMPOSITE BLADE TRACK SEGMENTS AND FULL HOOP CARRIER

FIELD OF THE DISCLOSURE

The present disclosure relates generally to gas turbine engines, and more specifically to turbine shroud assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. Such static shrouds may be coupled to an engine case that surrounds the compressor, the combustor, and the turbine.

Some shrouds positioned in the turbine may be exposed to high temperatures from products of the combustion reaction in the combustor. Such shrouds sometimes include components made from materials that have different coefficients of thermal expansion. Due to the differing coefficients of thermal expansion, the components of some turbine shrouds expand at different rates when exposed to combustion products. In some examples, coupling such components with traditional fasteners such as rivets or bolts may not allow for the differing levels of expansion and contraction during operation of the gas turbine engine.

SUMMARY

The present disclosure may comprise one or more of the following features and combinations thereof.

According to an aspect of the present disclosure, a turbine shroud adapted for use in a gas turbine engine may include a blade track segment, a full-hoop carrier, and a mounting system. The blade track segment may include ceramic matrix composite materials. The blade track segment may also include an arcuate shroud wall and a mount post. The arcuate shroud wall may extend circumferentially partway around an axis and may also define a gas path boundary of the turbine shroud. The mount post may extend radially outward away from the shroud wall and may also extend circumferentially relative to the axis. The mount post can be spaced apart axially from forward and aft ends of the shroud wall.

The full-hoop carrier may include metallic materials. The full-hoop carrier may be configured to support the blade track segment in a radial position relative to the axis. The carrier may include an annular outer wall, a forward attachment flange, and an aft attachment flange. The annular outer wall may extend circumferentially around the entire axis. The forward attachment flange may extend radially inward from the outer wall and circumferentially at least partway around the axis. The aft attachment flange may extend radially inward from the outer wall and circumferentially at least partway around the axis. The forward attachment flange can be spaced apart axially from the aft attachment flange. A channel may be formed between the forward attachment flange and the aft attachment flange. In some embodiments, the outer wall, the forward attachment flange, and the aft attachment flange may form a single, one-piece, integral component.

The mounting system may include a plurality of pins that extend axially through the forward attachment flange, the mount post, and the aft attachment flange. The mounting system may couple the blade track segment with the carrier. The mounting system may limit circumferential and radial movement of the blade track segment relative to the carrier.

In some embodiments, the mount post may be the only mount post included in the blade track segment. The mount post can be located in the channel axially between the forward attachment flange and the aft attachment flange.

In some embodiments, the turbine shroud includes an outer turbine case arranged circumferentially around the carrier. The carrier further includes a mount flange that extends radially outward away from the outer wall. The mount flange is coupled directly with the outer turbine case.

In some embodiments, the outer wall of the carrier may include a forward terminating end, an aft terminating end, and a mount flange. The aft terminating end may be spaced apart axially from the forward terminating end. The mount flange may extend radially outward away from the forward terminating end. The forward attachment flange and the aft attachment flange may be spaced apart from both the forward terminating end and the aft terminating end.

In some embodiments, the outer wall may be formed to define relief slots. The relief slots may extend axially forward from the aft terminating end partway through the outer wall and terminate axially at or before the mount flange.

In some embodiments, the forward attachment flange can be formed to define slots that extend axially through and radially inward into the forward attachment flange. The slots may terminate radially at or before the outer wall.

In some embodiments, the carrier may include an inner wall that is spaced apart radially inward away from the outer wall. The inner wall may extend between, and directly connect, terminating ends of the forward attachment flange and the aft attachment flange.

In some embodiments, the inner wall may be formed to define cooling holes. The cooling holes may extend radially through the inner wall to direct air toward the shroud wall.

In some embodiments, the outer wall, the forward attachment flange, the aft attachment flange, and the inner wall may cooperate to define the channel. The channel can extend radially inward into the carrier and may open radially outward.

In some embodiments, the blade track segment may further include a second mount post that is spaced axially apart from the mount post. The forward attachment flange, the aft attachment flange, and the inner wall may be located axially between the mount post and the second mount post.

According to another aspect of the present disclosure, a turbine shroud adapted for use in a gas turbine engine may include a blade track segment, a full-hoop carrier, and a mounting system. The blade track segment may include an arcuate shroud wall and a mount post. The arcuate shroud wall may extend circumferentially partway around an axis. The mount post may extend radially outward away from the shroud wall.

The full-hoop carrier may include an annular outer wall, a first attachment flange, and a second attachment flange. The annular outer wall may extend circumferentially around the entire axis. The first attachment flange may extend radially inward from the outer wall. The second attachment flange may extend radially inward from the outer wall. In some embodiments, the outer wall, the first attachment flange, and the second attachment flange form a single, one-piece, integral component. The mounting system may couple the mount post of the blade track segment with the forward attachment flange and the aft attachment flange of the carrier.

In some embodiments, the first attachment flange may be spaced apart from the second attachment flange to define a channel therebetween. Holes may or may not extend through the outer wall of the carrier that open into the channel.

In some embodiments, the mount post may be the only mount post included in the blade track segment. The mount post may be located in the channel axially between the first attachment flange and the second attachment flange.

In some embodiments, the outer wall may be formed to define relief slots. The relief slots may extend axially forward from an aft terminating end of the carrier partway through the outer wall and terminate axially at or before a forward terminating end of the carrier.

In some embodiments, the first attachment flange may be formed to define slots that extend axially through and radially inward into the first attachment flange. The slots may terminate radially at or before the outer wall.

In some embodiments, the blade track segment may further include a second mount post that is spaced axially apart from the mount post. The first attachment flange, the second attachment flange, and the inner wall may be located axially between the mount post and the second mount post.

According to another aspect of the present disclosure, a method may provide a blade track segment, a full-hoop carrier, and an outer case. The blade track segment may include an arcuate shroud wall and a mount post that extends radially outward away from the shroud wall relative to an axis. The full-hoop carrier may include an annular outer wall, a forward attachment flange that extends radially inward from the outer wall, and an aft attachment flange that extends radially inward from the outer wall. The full-hoop carrier may couple the mount post of the blade track segment with the forward attachment flange and the aft attachment flange of the carrier. The full-hoop carrier may couple with the outer case. In some embodiments, the method may include inserting a pin axially through the mount post, the forward attachment flange, and the aft attachment flange to couple the blade track segment and full-hoop carrier together.

These and other features of the present disclosure will become more apparent from the following description of the illustrative embodiments.

DETAILED DESCRIPTION OF THE DRAWINGS

Figure 1:
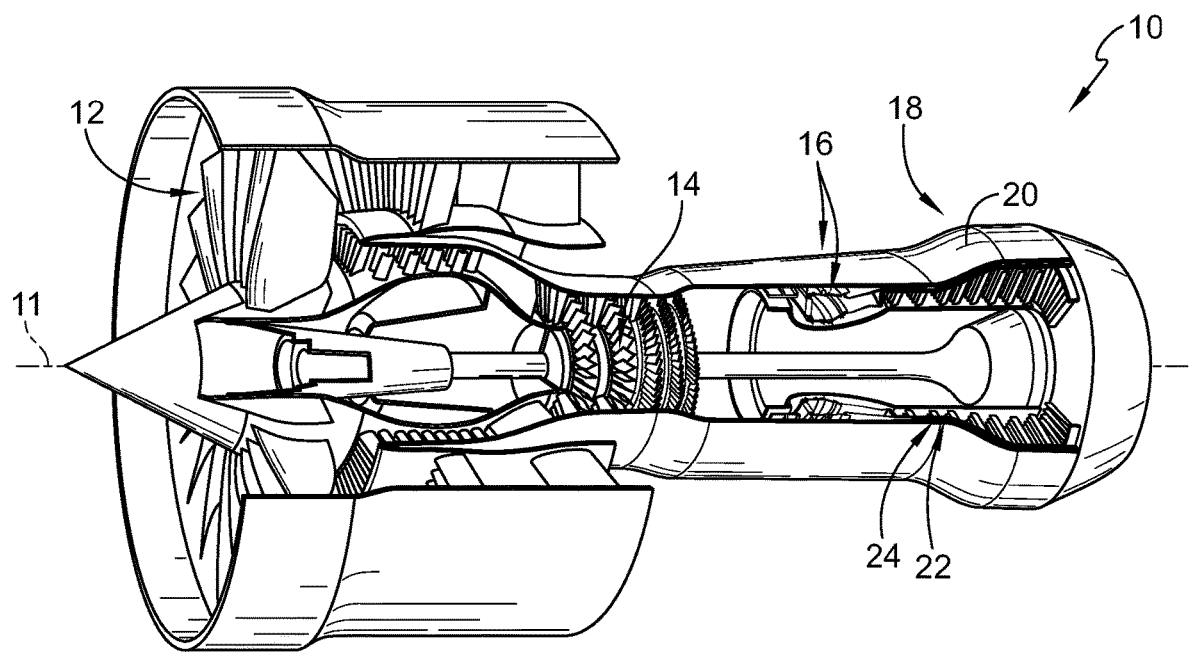
FIG. 1 is a cutaway view of a gas turbine engine that includes a fan, a compressor, a combustor, and a turbine, the turbine includes a turbine shroud that extends circumferentially around the axis and turbine wheels that are driven to rotate about an axis of the engine to generate power.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan 12, a compressor 14, a combustor 16, and a turbine 18 as shown in FIG. 1. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 11 and drive the compressor 14 and the fan 12. In some embodiments, the fan may be replaced with a propeller, drive shaft, or other suitable configuration.

Figure 2:
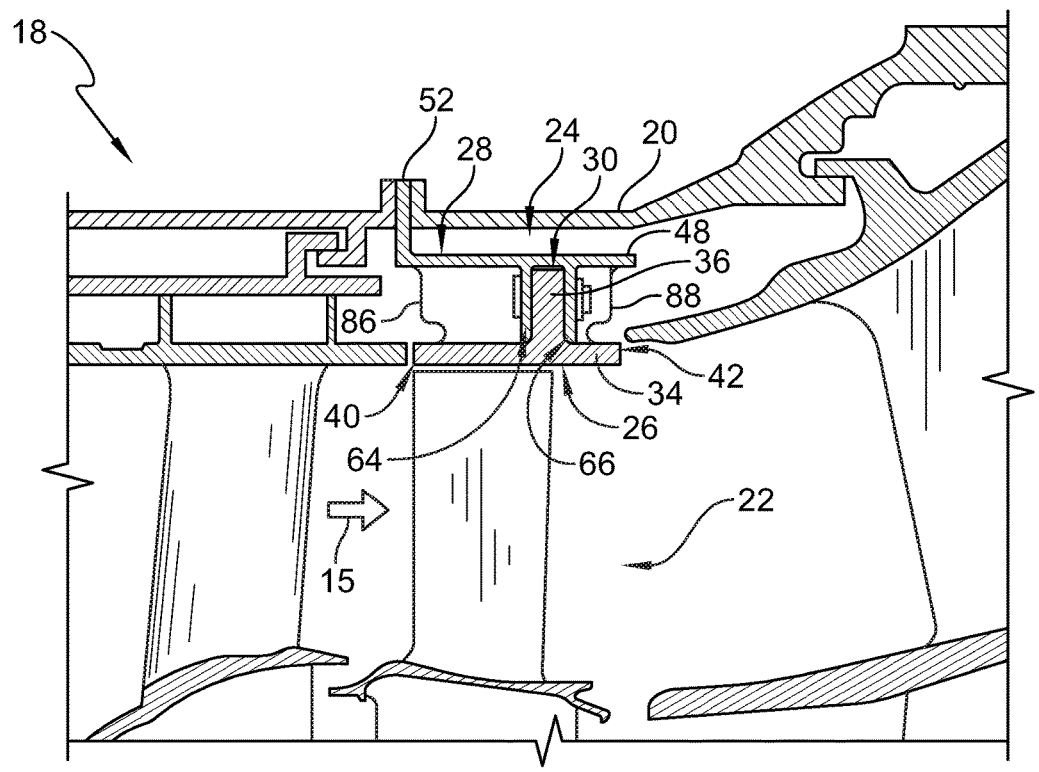
FIG. 2 is a cross-sectional view of a portion of the turbine included in the gas turbine of FIG. 1 showing one of the turbine wheel assemblies and the turbine shroud arranged around the turbine wheel assembly and including a blade track segment and a carrier that extends circumferentially around the entire axis and forms a channel that receives a mount post of the blade track segment.

The turbine 18 includes a turbine outer case 20, at least one turbine wheel assembly 22 and a turbine shroud assembly 24 positioned to surround the turbine wheel assembly 22 as shown in FIGS. 1 and 2. The turbine shroud assembly 24 includes a full-hoop carrier 28 that couples to the turbine outer case 20 as shown in FIG. 2. The turbine shroud assembly extends circumferentially about the engine axis and defines a gas path 15 outer boundary through which hot, high-pressure combustion products can flow. The turbine shroud assembly 24 cooperates with the turbine wheel assembly 22 to prevent combustion products from passing over the top of the turbine wheel assembly 22. Thereby, the combustion products force the turbine wheel assembly 22 to rotate and drive the compressor 14 and the fan 12.

Figure 3:
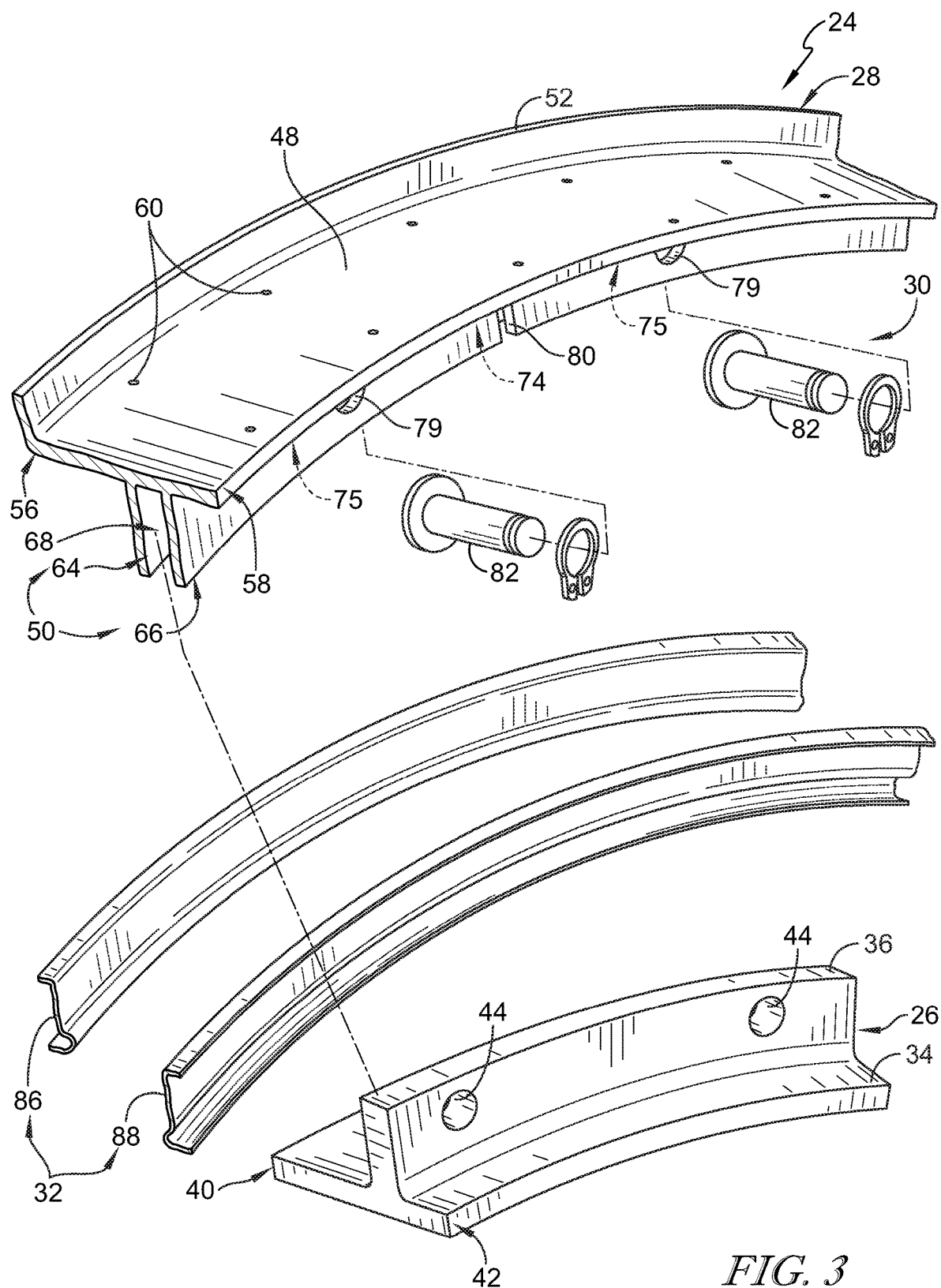
FIG. 3 is an exploded perspective assembly view of the turbine shroud of FIG. 2 suggesting that the carrier extends circumferentially fully around the axis and includes a forward mount flange extending radially outward from an outer carrier wall at the forward end of the carrier, and forward and aft attachment flanges extending radially inward from the outer wall of the carrier that define a channel therebetween, and further showing the blade track segment adapted to extend into the channel, a plurality of pins configured to couple the blade track segment with the carrier, and a forward seal and an aft seal that extend substantially circumferentially around the axis.

The turbine shroud assembly 24 includes a plurality of blade track segments 26, a full-hoop carrier 28, and a mounting system 30 configured to couple the blade track segments 26 to the full-hoop carrier 28 as shown in FIGS. 2 and 3. The turbine shroud assembly 24 also includes seals 32 that seal between the forward and aft portions of the blade track segments 26 and the full-hoop carrier 28. The full-hoop carrier 28 is a metallic support component configured to interface with other metallic components spaced apart from the gas path 15. The blade track segments 26 are ceramic matrix composite components configured to directly face the high temperatures of the gas path 15. The mounting system 30 is designed to locate the blade track segments 26 in the radial, axial and circumferential directions in the full-hoop carrier 28 and distribute mounting and pressure loads to the full-hoop carrier 28 and turbine shroud assembly 24.

Figure 4:
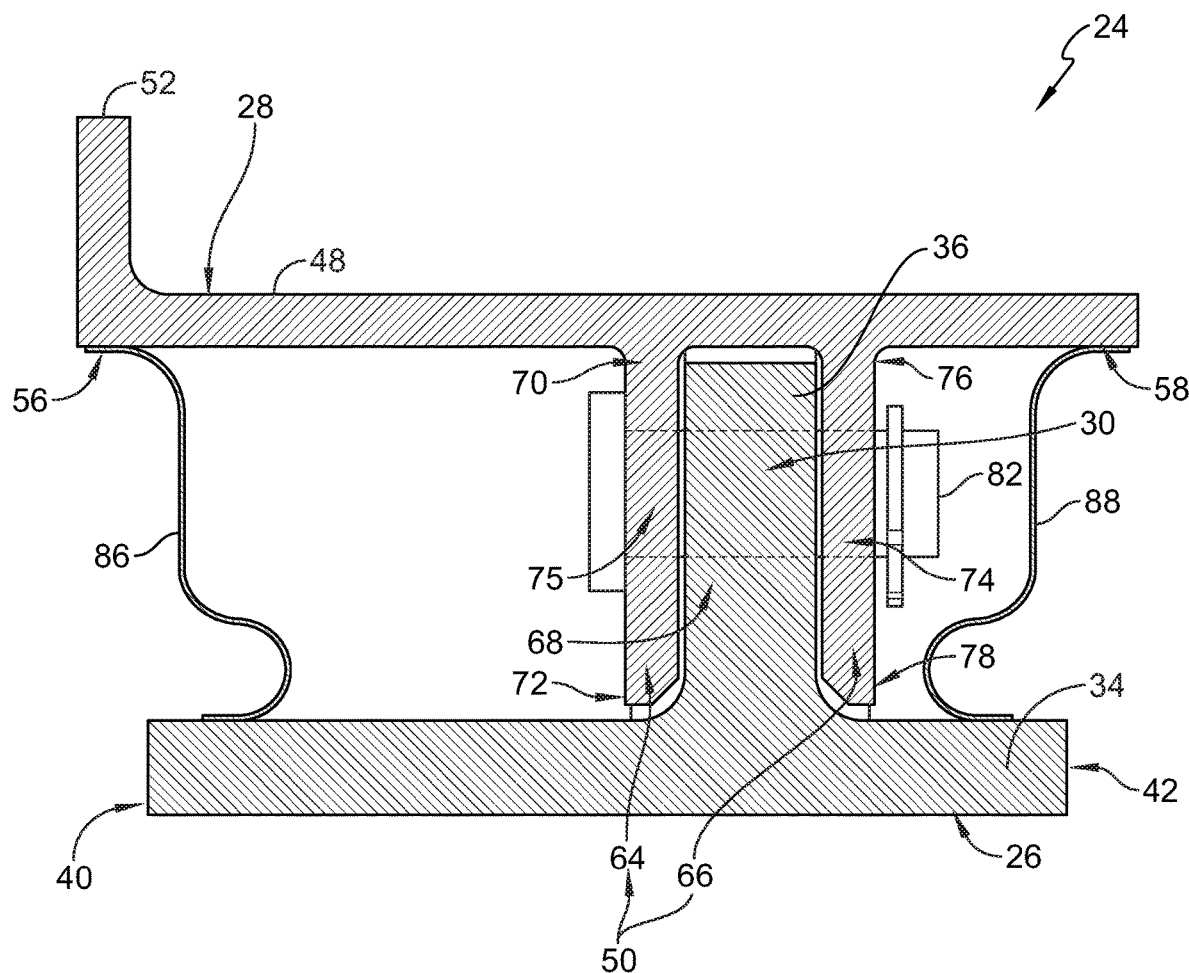
FIG. 4 is a detailed view of a portion of FIG. 2 showing the turbine shroud includes the carrier, the blade track segment, the forward seal and the aft seal, and the mount post of the blade track segment assembles between the forward and aft attachment flanges of the carrier and is connected using pins that extend axially through the forward attachment flange, the blade track segment mount post, and the aft attachment flange.

Each blade track segment 26 extends circumferentially partway around the engine axis 11 and forms the outer surface of the gas path 15 as shown in FIGS. 2 and 3. The blade track segment 26 includes a shroud wall 34 and a mount post 36 as shown in FIGS. 3 and 4. The shroud wall 34 is arcuate and extends circumferential partway around the engine axis 11 and extends a limited axial distance across the engine axis 11. The shroud wall 34 cooperates with the turbine wheel assembly 22 to block hot gases in the gas path 15 from passing over the top of the turbine wheel assembly 22. The mount post 36 extends radially outward from the shroud wall 34 to provide structure for coupling the blade track segment 26 to the full-hoop carrier 28.

The shroud wall 34 includes a forward end 40 and an aft end 42 as shown in FIGS. 2 and 4. The forward end 40 and aft end 42 of the shroud wall 34 define an axial portion of the gas path 15 that is adjacent to the turbine wheel assembly 22. The forward end 40 is located axially aft of an adjacent turbine component outer platform such as, but not limited to, a high-pressure turbine vane. The aft end 42 is located axially forward of an adjacent turbine component outer platform such as, but not limited to, an intermediate-pressure turbine vane.

Figure 5:
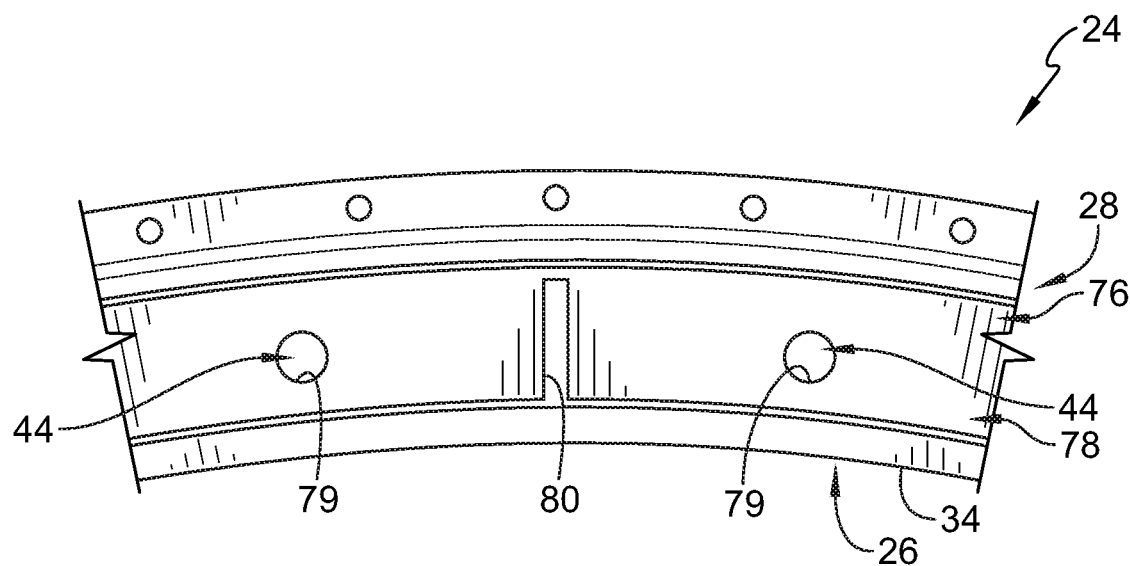
FIG. 5 is an aft elevation view of a portion of the turbine shroud of FIG. 2 with the aft seal removed showing a slot that extends axially through the aft attachment flange of the carrier and extends radially outward to the outer wall of the carrier to allow for circumferential expansion of the carrier under engine running conditions.

The mount post 36 extends radially outward from the shroud wall 34 and includes at least one through hole 44 that enable the blade track segment 26 to be coupled to the full-hoop carrier 28. In the illustrative embodiment, the mount post 36 includes two through holes 44 as shown in FIGS. 3 and 5. Illustratively, each blade track segment 26 includes a single mount post 36. The single mount post 36 is located axially aft of a midpoint of the blade track segment 26.

The mount post 36 is formed as a solid band with holes 44. In other embodiments, the mount post 36 may be formed from axially extending cylinders. In other embodiments, the mount post 36 may include scallops or cutouts that extend radially into the mount post 36. Each blade track segment 26 is substantially "T" shaped in the illustrative embodiment. Each blade track segment 26 is solid ceramic matrix composite materials throughout the blade track segment 26. In some embodiments, layers of material may be applied to an inner surface of the blade track segments 26 for abrasion, thermal or environmental protections, etc.

The full-hoop carrier 28 extends circumferentially completely around the engine axis 11 as suggested in FIG. 3. The full-hoop carrier 28 includes an outer wall 48, at least two attachment features 50, and a mounting flange 52 as shown in FIGS. 2, 3 and 4. The outer wall 48 extends axially partway across the engine axis and connects the mounting flange 52 with the attachment features 50. The mounting flange 52 extends radially outward from the outer wall 48 and couples with the turbine outer case 20 of the turbine 18. The attachment features 50 extend radially inward from the outer wall 48 and are spaced axially aft of the mounting flange 52. The attachment features 50 provide structure for the plurality of blade track segments 26 to couple to.

The outer wall 48 extends circumferentially completely around the engine axis 11 and axially partway across the engine axis 11 as shown in FIG. 3. The outer wall 48 includes a forward terminating end 56, an aft terminating end 58, and a plurality of cooling holes 60 that extend radially through the outer wall 48. The forward terminating end 56 aligns on the outer surface with the mounting flange 52 and provides sealing capability on the inner surface for the full-hoop seals 32. The aft terminating end 58 is located axially aft of the attachment features 50 and provides sealing capability on the inner surface for the full-hoop seal 32. The plurality of cooling holes 60 are configured to provide cooling air to the outer surface of the shroud wall 34.

The attachment features 50 extend radially inward from the outer wall 48 and include a forward attachment feature 64, an aft attachment feature 66, and an inward carrier channel 68 that is formed therebetween as shown in FIG. 4. The forward attachment feature 64 is located aft of the forward terminating end 56 of the outer wall 48 and forward of the aft attachment feature 66. The aft attachment feature is located forward of the aft terminating end 58 of the outer wall 48 and aft of the forward attachment feature 64. The forward and aft attachment features 64, 66 are located an axial distance apart from each other so that the inward carrier channel 68 can accommodate the mount post 36 of the blade track segment 26. In some embodiments, the channel 68 may be sized to interference fit with the mount post 36.

The forward attachment feature 64 includes a radial outer end 70 and a radial inner terminating end 72 and a plurality of assembly holes 75 as shown in FIG. 4. The radial outer end 70 of the forward attachment feature 64 is positioned adjacent to the inner surface of the outer wall 48. The radial inner terminating end 72 is located radially inward from the radial outer end 70 and adjacent to the shroud wall 34 of the blade track segment 26. The plurality of assembly holes 75 are circumferentially spaced equally around the forward attachment feature 64 and align with the through holes 44 of the mount post 36 of the blade track segment 26.

In an embodiment, the forward attachment feature 64 includes a forward radial relief slot 74 as suggested in FIG. 3. Multiple forward radial relief slots 74 can be included in the forward attachment feature 64 spaced circumferentially around the axis 11. The forward radial relief slot 74 extends axially through the forward attachment feature 64, and circumferentially a small distance around the axis 11. The forward radial relief slot 74 extends radially outward from the radial inner terminating end 72 toward the radial outer end 70 of the forward attachment feature 64. The forward radial relief slot 74 allows for thermal expansion of the full-hoop carrier 28 as the gas turbine engine 10 heats and cools during normal operation.

The aft attachment feature 66 includes a radial outer end 76 and a radial inner terminating end 78 and a plurality of assembly holes 79 as shown in FIGS. 4 and 5. The radial outer end 76 of the aft attachment feature 66 is positioned adjacent to the inner surface of the outer wall 48. The radial inner terminating end 78 is located radially inward from the radial outer end 70 and adjacent to the shroud wall 34 of the blade track segment 26. The plurality of assembly holes 79 are circumferentially spaced equally around the aft attachment feature 66 and align with the through holes 44 of the mount post 36 of the blade track segment 26.

In an illustrative embodiment, the aft attachment feature 66 includes an aft radial relief slot 80 as shown in FIGS. 3 and 5. Multiple aft radial relief slots 80 can be included in the aft attachment feature 66 spaced circumferentially around the axis 11. The aft radial relief slot 80 extends axially through the aft attachment feature 66, and circumferentially a small distance around the axis 11. The aft radial relief slot 80 extends radially outward from the radial inner terminating end 78 toward the radial outer end 76 of the aft attachment feature 66. The aft radial relief slot 80 allows for thermal expansion of the full-hoop carrier 28 as the gas turbine engine 10 heats and cools during normal operation. The aft radial relief slots 80 are aligned circumferentially with the forward radial relief slots 74.

The mounting system 30 couples the plurality of blade track segments 26 to the full-hoop carrier 28 and includes a plurality of attachment pins 82 as shown in FIG. 3. Each blade track segment 26 is assembled so that the mount post 36 aligns axially with the inward carrier channel 68 between the forward and aft attachment features 64, 66. The through holes 44 in the mount post 36 of the blade track segment 26 align circumferentially and radially with the assembly holes 75, 79 in the forward and aft attachment features 64, 66. The plurality of attachment pins 82 extend through the assembly hole 75 of the forward attachment feature 64, the through hole 44 of the mount post 36, and the assembly hole 79 of the aft attachment feature 66. At least one attachment pin 82 can be used to mount a blade track segment 26 to the full-hoop carrier 28. The illustrative embodiment in FIG. 3 shown two attachment pins 82 to couple the blade track segment 26 to the full-hoop carrier 28.

The seals 32 block gases from flowing between the full-hoop carrier 28 and the plurality of blade track segment 26 as suggested in FIG. 4. The seals 32 include a forward seal 86 and an aft seal 88 as shown in FIGS. 3 and 4. The forward seal 86 seals between the inner surface of the forward terminating end 56 of the outer wall 48 of the full-hoop carrier 28 and the forward end 40 of the shroud wall 34 of the blade track segment 26. The aft seal 88 seals between the inner surface of the aft terminating end 58 of the outer wall 48 of the full-hoop carrier 28 and the aft end 42 of the shroud wall 34 of the blade track segment 26. The seals 32 enable a cavity to be created between the full-hoop carrier 28 and the plurality of blade track segments 26 where a controlled pressure can be established or cooling air can be provided. The seals 32 may be completely full-hoop or can be a split ring have terminating ends that overlap to form a 360 degree or greater profile, but with additional ability to expand and contract.

Figure 6:
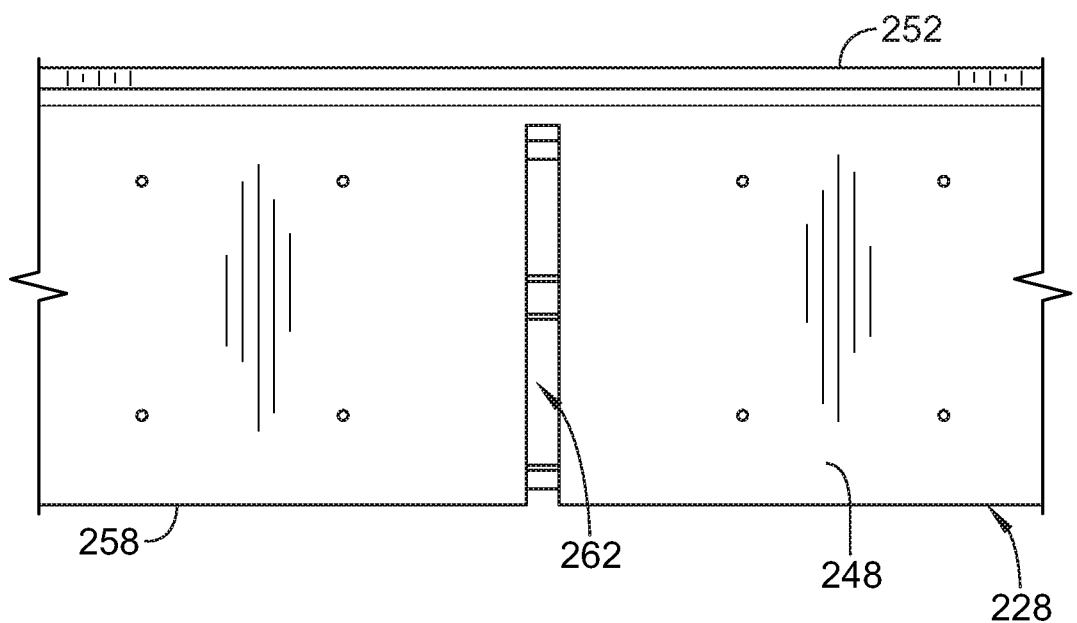
FIG. 6 is a detailed view looking radially inward on a carrier of another embodiment of the turbine shroud of FIG. 2 showing a relief slot in the outer wall that extends axially from the aft end of the carrier, through the forward and aft attachment flanges, to the front mount flange of the carrier, and allows for circumferential expansion of the carrier under engine running conditions.

Another embodiment of a full-hoop carrier 228 in accordance with the present disclosure is shown in FIG. 6. The full-hoop carrier 228 is substantially similar to the full-hoop carrier 28 shown in FIGS. 1-5 and described herein. Accordingly, similar reference numbers in the 200 series indicate features that are common between the full-hoop carrier 228 and the full-hoop carrier 28. The description of the full-hoop carrier 28 is incorporated by reference to apply to the full-hoop carrier 228, except in instances when it conflicts with the specific description and the drawings of the full-hoop carrier 228.

In the full-hoop carrier 228, the outer wall 248 includes a relief slot 262 as shown in FIG. 6. Multiple relief slots 262 can be included in the outer wall 248 and circumferentially spaced equally apart around the full-hoop carrier 228. The relief slot 262 extends radially through the outer wall 248, and circumferentially a small distance around the axis 11. The relief slot 262 extends axially forward from the aft terminating end 258 toward the mounting flange 252. The relief slot 262 allows for thermal expansion of the full-hoop carrier 228 as the gas turbine engine heats and cools during normal operation. The relief slot 262 extends through the attachment features of the blade track segment. The mounting flange 252 and a forward section of the outer wall 248 are a continuous full hoop.

Figure 7:
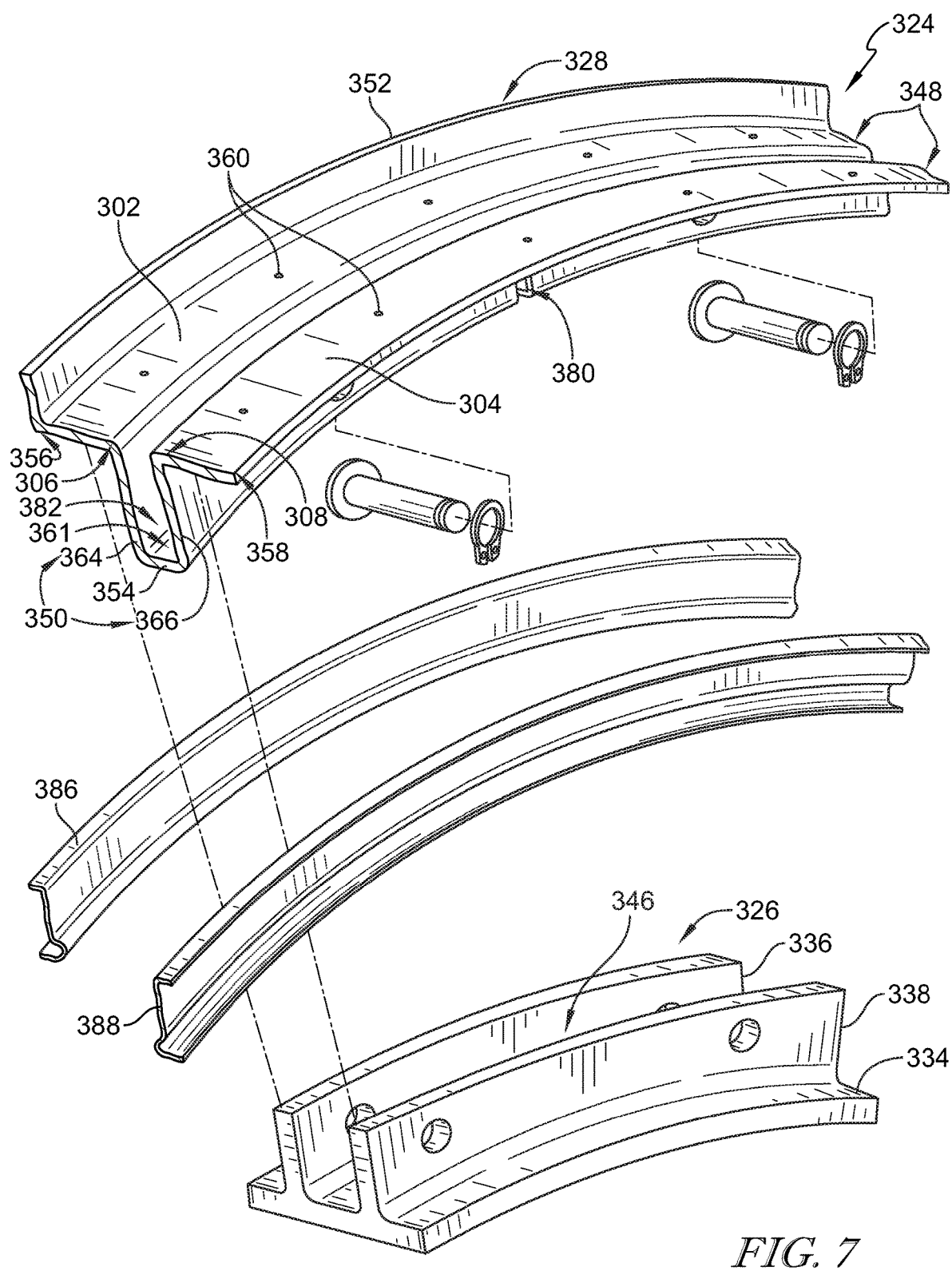
FIG. 7 is an exploded perspective assembly view of another turbine shroud showing a carrier that extends circumferentially about an axis and is formed to include a forward mount flange, a forward attachment flange, an aft attachment flange, and an inner wall that connects the inner portion of the forward attachment flange to the inner portion of the aft attachment flange, and further showing a blade track segment that includes a forward mount post and an aft mount post configured to assemble to the carrier with attachment pins that extend through the mount post of the blade track segment and the carrier.
Figure 8:
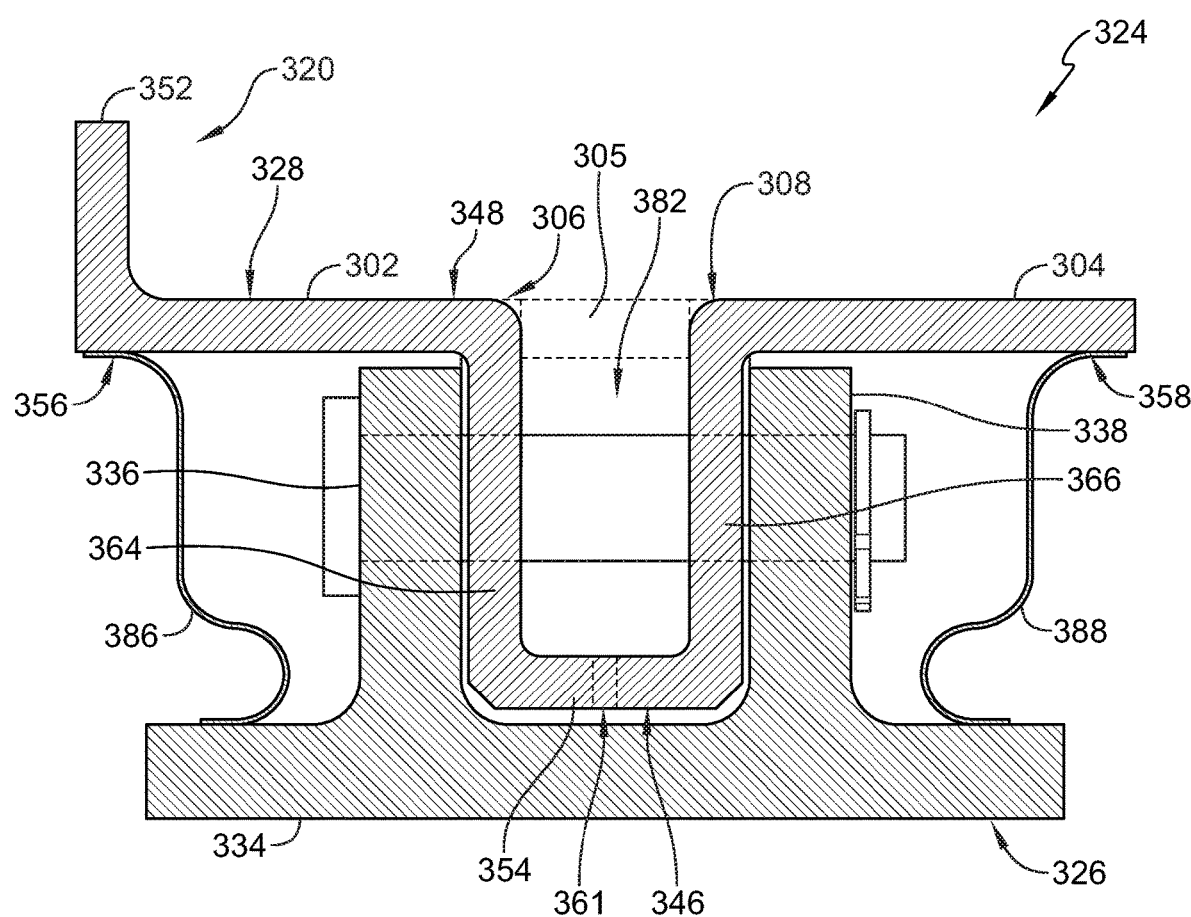
FIG. 8 is a cross-sectional view of the turbine shroud of FIG. 7 showing the carrier, the blade track segment, a forward seal and an aft seal, and pins that extend axially through the blade track segment and the carrier to couple the blade track segment with the carrier.
Figure 9:
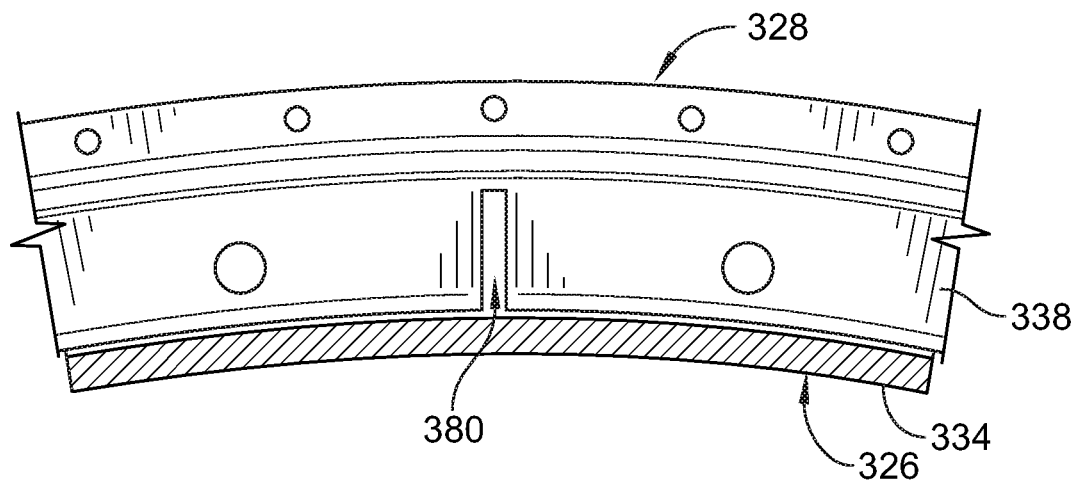
FIG. 9 is an aft elevation view of the turbine shroud of FIG. 7 with the aft seal removed showing a slot that extends axially through the inner wall and the forward and aft attachment flanges of the carrier and that extends radially outward to the outer wall of the carrier to allow for circumferential expansion of the carrier under engine running conditions.

Another embodiment of turbine shroud assembly 324 in accordance with the present disclosure is shown in FIGS. 7-9. The turbine shroud assembly 324 is substantially similar to the turbine shroud assembly 24 shown in FIGS. 1-5 and described herein. Accordingly, similar reference numbers in the 300 series indicate features that are common between the turbine shroud assembly 324 and the turbine shroud assembly 24. The description of the turbine shroud assembly 24 is incorporated by reference to apply to the turbine shroud assembly 324, except in instances when it conflicts with the specific description and the drawings of the turbine shroud assembly 324.

The turbine shroud assembly 324 includes a carrier 238 and a blade track segment 326 as shown in FIG. 7. The blade track segment 326 includes a first mount post 336 and a second mount post 338 which extends radially from the shroud wall 334 as shown in FIGS. 7 and 8. The second mount post 338 is positioned axially aft of the first mount post 336 to define a blade track attachment channel 346 therebetween. The first and second mount posts 336, 338 provide structure for coupling the blade track segment 326 to the full-hoop carrier 328.

The full-hoop carrier 328 includes an outer wall 348, at least two attachment features 350, a mounting flange 352, and an inner wall 354 as shown in FIGS. 7 and 8. The mounting flange 352 extends radially outward from the outer wall 348 and couples the full-hoop carrier 328 to the turbine case 320. The outer wall 348 and the inner wall 354 are spaced radially apart so that the outer wall 348 is radially outward of the inner wall 354. The attachment features 350 extend radially between the outer wall 348 and the inner wall 354 to connect outer wall 348 and inner wall 354 together. The inner wall 354 extends axially across the axis 11 and connects the attachment features 350 together. The attachment features 350 and the inner wall 354 create an outward radial channel 382 that extends radially outward from the inner wall 354.

The attachment features 350 extend radially inward from the outer wall 348 and include a forward attachment feature 364, an aft attachment feature 366 as shown in FIG. 8. The forward attachment feature 364 is located aft of the forward terminating end 356 of the outer wall 348 and forward of the aft attachment feature 366. The aft attachment feature 366 is located forward of the aft terminating end 358 of the outer wall 348 and aft of the forward attachment feature 364. The forward and aft attachment features 364, 366 are located an axial distance apart from each other so that the forward and aft attachment features 364, 366 align inside the blade track attachment channel 346. Thus, the first mount post 336 of the blade track segment 326 is located forward of the forward attachment feature 364, and the second mount post 338 sits axially aft of the aft attachment feature 366.

The outer wall 348 is divided into a forward portion 302 and an aft portion 304 by the attachment features 350 as shown in FIG. 8. The forward portion 302 includes the forward terminating end 356 and an aft end 306. The forward terminating end 356 aligns on the outer surface with the mounting flange 352 and provides sealing capability on the inner surface for the forward seal 386. The aft end 306 is connected to the forward attachment feature 364. The aft portion 304 includes a forward end 308 and an aft terminating end 358. The aft terminating end 358 is located axially aft of the aft attachment feature 366 and provides sealing capability on the inner surface for the aft seal 388. The forward end 308 of the aft portion 304 connects to the aft attachment feature 366. The forward portion 302 and aft portion 304 of the outer wall 348 also include a plurality of cooling holes 360 that can provide cooling air to the top surface of the blade track segment 326.

Figure 10:
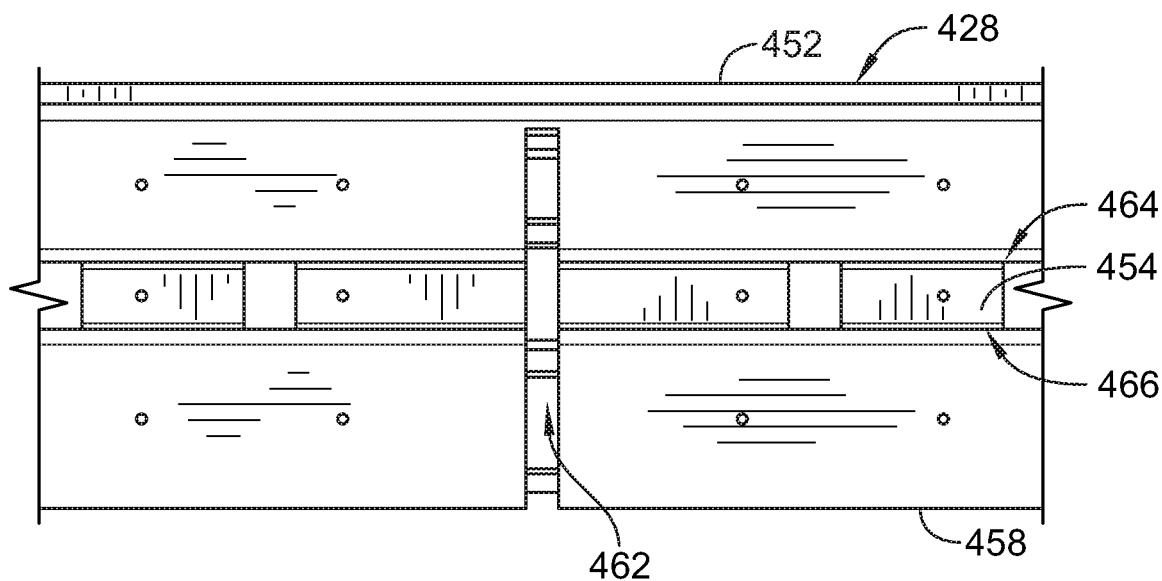
FIG. 10 is a detailed view looking radially inward on the carrier of another embodiment of the turbine shroud of FIG. 7 showing a relief slot in the outer wall that extends axially from the aft end of the carrier through the inner wall and forward and aft attachment flanges, to the front mount flange of the carrier, and allows for circumferential expansion of the carrier under engine running conditions.

The inner wall 354 connects the inner radial ends of the forward attachment feature 364 and the aft attachment feature 366, and includes a plurality of cooling holes 361 as shown in FIGS. 8 and 10. The cooling holes can be configured to impinge cooling air on the blade track segment 326 in the blade track attachment channel 346. The inner wall 354 may form an annular cavity with the blade track segment 326 for the cooling air to be distributed annularly about the blade track segment 326.

In an illustrative embodiment, the inner wall 354, the forward attachment feature 364 and the aft attachment feature 366 include a radial relief slot 380 as shown in FIGS. 7 and 9. Multiple radial relief slots 380 can be included full-hoop carrier 328 spaced circumferentially equally around the axis 11. The radial relief slot 380 extends axially through the inner wall 354, the forward attachment feature 364 and the aft attachment feature 366, and circumferentially a small distance around the axis 11. The radial relief slot 380 extends radially outward from the inner wall 354 to outer wall 348 but not through the outer wall 348. The radial relief slot 380 allows for thermal expansion of the full-hoop carrier 328 as the gas turbine engine heats and cools during normal operation.

In a further embodiment, the forward portion 302 and the aft portion 304 of the outer wall 348 are connected by an outer wall plate 305 as shown in FIG. 8. The outer wall plate 305 connects the aft end 306 of the forward portion 302 with the forward end 308 of the aft portion 304 thereby enclosing the outward radial channel 382. The outer wall plate 305 can be bonded, welded or similar into position. The outer wall plate 305 can substantially similar material to the outer wall 348, or can be sheet metal or composite or similar. The outer wall plate 305 may be integrally formed with the forward portion 302 and the aft portion 304 while the attachment features 350 are bonded with the outer wall 348 and/or outer wall plate 305.

Another embodiment of a full-hoop carrier 428 in accordance with the present disclosure is shown in FIG. 10. The full-hoop carrier 428 is substantially similar to the full-hoop carrier 28 shown in FIGS. 1-5 and described herein. Accordingly, similar reference numbers in the 400 series indicate features that are common between the full-hoop carrier 428 and the full-hoop carrier 28. The description of the full-hoop carrier 28 is incorporated by reference to apply to the full-hoop carrier 428, except in instances when it conflicts with the specific description and the drawings of the full-hoop carrier 428.

The full-hoop carrier 428 includes a relief slot 462 in the outer wall 448, the forward and aft attachment features 464, 466 and the inner wall 454 as shown in FIG. 10. Multiple relief slots 462 can be included full-hoop carrier 428 and circumferentially spaced equally around the axis 11. The relief slot 462 extends radially through the inner wall 454, the forward and aft attachment features 464, 466, and the outer wall 448, and circumferentially a small distance around the axis 11. The relief slot 462 extends axially forward from the aft terminating end 458 toward the mounting flange 452. The relief slot 462 allows for thermal expansion of the full-hoop carrier 428 as the gas turbine engine heats and cools during normal operation.

In a further embodiment, the mounting system 30 may use frictional forces to hold the blade track segment 26 in place relative to the axis 11 at all operating points of the gas turbine engine 10 throughout the operating envelope without the assistance of the attachment pins 82 or other fasteners or interlocking mechanisms like bolts, keys, hooks, etc. This configuration may reduce the peak mechanical stresses applied to the attachment pins 82 and pin interfaces of the blade track segment 26. Even still, the attachment pins 82 and clamping frictional forces may each be configured share the load or to each carry one hundred percent (100%) of the radial force loads acting on the blade track segment 26 during use of the turbine shroud assembly 24 without failing so that the turbine shroud assembly 24 has redundant support features for the blade track segment 26.

In some embodiments, the full-hoop carrier 28 may reduce the number of parts in the turbine shroud assembly 24, which may further reduce assembly weight, manufacturing costs, and leakage air. The reduction in the total number of components may also reduce the number of seals in the turbine shroud assembly 24 and increase the sealing of the turbine 18. In other embodiments, the full-hoop carrier 28 may add stiffness that may allow the full-hoop carrier 28 to have a smaller cross-sectional area compared to a segmented carrier design.

In some embodiments, the full-hoop carrier 28 may be configured to assemble with an inverted T-shaped blade track segment 26. The outer wall 48 of the full-hoop carrier 28 may extend axially forward of the forward end 40 of the blade track segment 26, and axially aft of the aft end 42 of the blade track segment 26, with a radially outward protruding mounting flange 52 at the forward terminating end 56 of the full-hoop carrier 28 that is used to fix the full-hoop carrier 28 to an turbine outer case 20 as shown in FIG. 2.

In other embodiments, it may be desired for the full-hoop carrier 28 to include at least two attachment features 50 that imitate a clevis configuration and serve to fix the blade track segment 26 to the full-hoop carrier 28 as shown in FIGS. 2 and 4. The attachment features 50 include assembly holes 75, 79, which correspond to holes 44 on the mount post 36 of the inverted-T blade track segment 26, where attachment pins 82 may position the blade track segment 26 radially relative to the full-hoop carrier 28.

In some embodiments, the pressure ratio at the forward terminating end 56 of the full-hoop carrier 28, and the aft terminating end of the full-hoop carrier may prevent any forward movement of the attachment pins 82 during operation. However, it may be desired to add retaining rings to the aft end of each attachment pin 82 as a redundant safety measure to prevent the attachment pin 82 from backing out of its position.

In other embodiments, the outer wall 48 of the full-hoop carrier 28 may include impingement holes on either end of the attachment features 50 that may help to cool the blade track segment 26 during engine operation. Sheet metal compression seals 32 may be placed on the forward and aft ends 56, 58 of the turbine shroud assembly. The seals 32 may be either segmented or quasi-full hoop featuring a split somewhere along the circumference in some embodiments. Both types of seal may allow for the seal 32 to freely expand and compress with the turbine shroud assembly 24 during operation. Additionally, a tandem seal may be added between the inner face of the full-hoop carrier 28 and the top of the mount post 36 of the blade track segment 26.

In some embodiments, the structure of the full-hoop carrier may change depending on the active tip clearance system employed in the gas turbine engine 10. If the turbine outer case 20 is used as a tip clearance control feature, then it may be desired to include a circumferential array of stiffness relief slots 262, which may allow a full range of movement of the turbine outer case 20 for proper tip clearance control as shown in FIG. 10. The relief slots may run axially from the aft terminating end 58 toward the mounting flange 52. Without these slots, the full-hoop carrier may be stiff and limit the movement of the turbine outer case 20 as it attempted to adjust the tip clearance during operation.

A further embodiment features a full-hoop carrier 328 for an inverted Pi-shaped blade track segment 326 as shown in FIG. 7. The axial length of the full-hoop carrier 328 may be similar to the full-hoop carrier 28. The mounting flange 352 may be similar to the mounting flange 52.

In some embodiments the full-hoop carrier 328 may feature a continuous cross section that contours to the middle section created by the U-shaped laminate on the blade track segment 326 as shown in FIG. 8. Assembly holes 75, 79 may be machined through the attachment features 350 to align to the holes on the mounts posts 336, 338 of the blade track segment 326. The attachment pins in this embodiment may be substantially similar to the attachment pins 82 of the mounting system 30.

In other embodiments, the forward portion 302 and the aft portion 304 of the full-hoop carrier 328 may be sealed using sheet metal compression seals 386, 388 which may be either segmented or quasi-full hoop in design. In the illustrative embodiment an additional row of impingement holes 361 may be used to cool the middle section of the blade track segment 326.

In other embodiments, a tandem seal could be included between the outward portion of the mount posts 336, 338 and the inner wall 354 of the full-hoop carrier 328. Alternatively, the tandem seal could be included between the blade track attachment channel 346 and the inner face of the inner wall 354. If the latter option is chosen, then the tandem seal cutout may replace the additional row of impingement holes. However, additional impingement hole rows could be added on either side of the tandem seal if additional cooling is desired. In some embodiments, stiffness relief slots 462 may be used if the turbine outer case 20 is used as a control feature for active tip clearance control.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud adapted for use in a gas turbine engine, the turbine shroud comprising
   a blade track segment comprising ceramic matrix composite materials, the blade track segment including an arcuate shroud wall that extends circumferentially partway around an axis to define a gas path boundary of the turbine shroud and a mount post that extends radially outward away from the shroud wall and circumferentially relative to the axis, the mount post being spaced apart axially from forward and aft ends of the shroud wall,
   a full-hoop carrier comprising metallic materials and configured to support the blade track segment in position radially relative to the axis, the carrier including an annular outer wall that extends circumferentially entirely around the axis, a forward attachment flange that extends radially inward from the outer wall and circumferentially at least partway about the axis and defines an axially aft facing surface, and an aft attachment flange that extends radially inward from the outer wall and circumferentially at least partway about the axis and defines an axially forward facing surface, the forward attachment flange being spaced apart axially from the aft attachment flange such that the axially aft facing surface and the axially forward facing surface define a channel therebetween, and
   a mounting system that includes a plurality of pins that extend axially through the forward attachment flange of the carrier, the mount post of the blade track segment, and the aft attachment flange of the carrier to couple the blade track segment with the carrier and to limit circumferential and radial movement of the blade track segment relative to the carrier,
   wherein the axially aft facing surface of the forward attachment flange is parallel with the axially forward facing surface of the aft attachment flange, and wherein the mount post is the only mount post included in the blade track segment and is located in the channel axially between the forward attachment flange and the aft attachment flange.

2. The turbine shroud of claim 1, wherein the outer wall, the forward attachment flange, and the aft attachment flange form a single, one-piece, integral component.

3. The turbine shroud of claim 2, wherein the outer wall of the carrier includes a forward terminating end and an aft terminating end spaced apart axially from the forward terminating end, the carrier further includes a mount flange that extends radially outward away from the forward terminating end, and the forward attachment flange and the aft attachment flange are spaced apart from each of the forward terminating end and the aft terminating end.

4. The turbine shroud of claim 3, wherein the outer wall is formed to define relief slots that extend axially forward from the aft terminating end partway through the outer wall and terminate axially at or before the mount flange.

5. The turbine shroud of claim 1, further comprising an outer turbine case arranged circumferentially around the carrier, the carrier further includes a mount flange that extends radially outward away from the outer wall, and the mount flange is coupled directly with the outer turbine case.

6. The turbine shroud of claim 1, wherein the forward attachment flange is formed to define slots that extend axially through and radially inward into the forward attachment flange and the slots terminate radially at or before the outer wall.

7. A turbine shroud adapted for use in a gas turbine engine, the turbine shroud comprising
a blade track segment including an arcuate shroud wall that extends circumferentially partway around an axis and a mount post that extends radially outward away from the shroud wall,
a full-hoop carrier including an annular outer wall that extends circumferentially entirely around the axis, a first attachment flange that extends radially inward from the outer wall, and a second attachment flange that extends radially inward from the outer wall,
a mounting system that couples the mount post of the blade track segment with the first attachment flange and the second attachment flange of the carrier,
wherein the first attachment flange is formed to define at least one flange slot that extends axially through and radially into the first attachment flange such that a radially inner end of the at least one flange slot opens radially inwardly, and wherein a radially outward end of the at least one flange slot terminates radially at or before the outer wall.

8. The turbine shroud of claim 7, wherein the outer wall, the first attachment flange, and the second attachment flange form a single, one-piece, integral component.

9. The turbine shroud of claim 7, wherein the first attachment flange is spaced apart from the second attachment flange to define a channel therebetween and no holes extend through the outer wall of the carrier that open into the channel.

10. The turbine shroud of claim 9, wherein the mount post is the only mount post included in the blade track segment and is located in the channel axially between the first attachment flange and the second attachment flange.

11. The turbine shroud of claim 7, wherein the outer wall is formed to define relief slots that extend axially forward from an aft terminating end of the carrier partway through the outer wall and terminate axially at or before a forward terminating end of the carrier.

12. The turbine shroud of claim 7, wherein the carrier includes an inner wall that extends between the forward attachment flange and the aft attachment flange, and wherein the blade track segment further includes a second mount post that is spaced apart axially from the mount post and wherein the first attachment flange, the second attachment flange, and the inner wall are located axially between the mount post and the second mount post.

13. The turbine shroud of claim 7, wherein the carrier includes an inner wall that is spaced apart radially inward away from the outer wall and extends between and directly connects terminating ends of the first attachment flange and the second attachment flange.

14. The turbine shroud of claim 13, wherein the inner wall is formed to define cooling holes that extend radially through the inner wall to direct air toward the shroud wall.

15. The turbine shroud of claim 13, wherein the outer wall, the first attachment flange, the second attachment flange, and the inner wall cooperate to define the channel and the channel extends radially inward into the carrier and opens radially outward.

16. The turbine shroud of claim 15, wherein the blade track segment further includes a second mount post that is spaced apart axially from the mount post and wherein the first attachment flange, the second attachment flange, and the inner wall are located axially between the mount post and the second mount post.

17. A method comprising
providing a blade track segment, a full-hoop carrier, and an outer case, the blade track segment includes an arcuate shroud wall and a mount post that extends radially outward away from the shroud wall relative to an axis, and the full-hoop carrier includes an annular outer wall, a forward attachment flange that extends radially inward from the outer wall and defines an axially aft facing surface, and an aft attachment flange that extends radially inward from the outer wall and defines an axially forward facing surface, wherein the axially aft facing surface of the forward attachment flange is parallel with the axially forward facing surface of the aft attachment flange, and wherein the mount post is the only mount post included in the blade track segment and is located axially between the forward attachment flange and the aft attachment flange,
coupling the mount post of the blade track segment with the forward attachment flange and the aft attachment flange of the carrier, and
coupling the carrier with the outer case.

18. The method of claim 17, wherein coupling the mount post of the blade track segment with the forward attachment flange and the aft attachment flange of the carrier includes inserting a pin axially through the mount post, the forward attachment flange, and the aft attachment flange.

* * * * *